(12) United States Patent  
Peter

(10) Patent No.: US 6,513,632 B2
(45) Date of Patent: Feb. 4, 2003

(54) PARK BRAKE SYSTEM FOR VEHICLES

(75) Inventor: Cornelius Peter, Bühl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 10/034,147

(22) Filed: Dec. 27, 2001

(65) Prior Publication Data

US 2002/0084154 A1 Jul. 4, 2002

(30) Foreign Application Priority Data

Dec. 29, 2000 (DE) ..................... 200 22 050 U

(51) Int. Cl.$^7$ .......................... F16D 65/36; B60T 13/74
(52) U.S. Cl. ................... 188/162; 188/156; 188/171
(58) Field of Search .................... 188/2 D, 72.8, 188/156, 162, 171, 265; 192/219.4

(56) References Cited

U.S. PATENT DOCUMENTS

| | | | |
|---|---|---|---|
| 5,180,038 A | * | 1/1993 | Arnold et al. .............. 188/171 |
| 5,442,250 A | | 8/1995 | Stridsberg |
| 5,590,744 A | * | 1/1997 | Belmond .................... 188/265 |
| 6,209,689 B1 | * | 4/2001 | Bohm ......................... 188/156 |
| 6,213,259 B1 | * | 4/2001 | Hanson et al. ............. 188/156 |
| 6,244,394 B1 | * | 6/2001 | Gutierrez et al. .......... 188/72.8 |

FOREIGN PATENT DOCUMENTS

| | | |
|---|---|---|
| DE | 3924327 A1 | 10/1990 |
| DE | 19627117 A1 | 3/1997 |
| DE | 19718679 A1 | 11/1998 |
| DE | 10025731 A1 | 12/2000 |
| DE | 19955301 A1 | 5/2001 |
| DE | 19962556 A1 | 7/2001 |
| EP | 0386771 A1 | 9/1990 |
| EP | 0978431 A1 | 2/2000 |
| FR | 27932031 A1 | 11/2000 |
| FR | 2808486 A1 | 11/2001 |
| WO | WO0073114 A1 | 12/2000 |

* cited by examiner

Primary Examiner—Christopher P. Schwartz
(74) Attorney, Agent, or Firm—Tarolli, Sundheim, Covell, Tummino & Szabo L.L.P.

(57) ABSTRACT

A park brake system for vehicles is provided that has an actuator with an electric drive motor and an electronic control unit provided with an interface. A reduction gear has an input connected to the output of the electric motor and an output member for connection to mechanical brakes of the vehicle. A command unit has a transducer connected to the electronic control unit. The transducer converts position indication signals into appropriate digital signals to enable the control unit to generate corresponding brake control commands. With appropriate control signals from the electronic control unit, the mechanical brake system can thus reflect positional brake commands from the command unit within an operating range from OFF to ON, including partial activation conditions of the park brake.

23 Claims, 5 Drawing Sheets

PARK BRAKE SYSTEM FOR VEHICLES

The present invention relates to a park brake system for vehicles that comprises an actuator with an electric drive motor and an electronic control unit.

BACKGROUND OF THE INVENTION

Conventional park brakes in vehicles usually include a pair of disk or drum brakes at the rear wheels of the vehicle, a mechanical actuating member such as a manually operated lever or a park brake pedal, and a brake cable connecting the brakes with the actuating member.

More sophisticated vehicles have an electric drive that actuates the park brake in response to a manually operated electric switch that can be mounted in the vehicle's dash board. In such a park brake system, the park brake function is either off or on.

SUMMARY OF THE INVENTION

The present invention provides a park brake system for vehicles that permits a more flexible function.

According to the invention, a park brake system for vehicles is provided that has an actuator with an electric drive motor and an electronic control unit provided with an interface. A reduction gear has an input connected to the output of the electric motor and an output member for connection to mechanical brakes of the vehicle. A command unit has a transducer connected to the electronic control unit. The transducer converts position indication signals into appropriate digital signals to enable the control unit to generate corresponding brake control commands. With appropriate control signals from the electronic control unit, the mechanical brake system can thus reflect positional brake commands from the command unit within an operating range from OFF to ON, including partial activation conditions of the park brake.

A park brake typically requires high actuation forces above 1000 N. Generating sufficiently high actuation forces with an electric drive normally entails high consumption of electric power. In addition, when the park brake is in the activated condition, it must remain in that condition even after ignition has been switched off and, therefore, without consumption of electric energy. Conventionally, some mechanical blocking means such as a latch would thus be required to maintain the park brake in an activated condition independent of the availability of electric current.

A preferred embodiment has a high efficiency drive with an inherent blocking function so that a fast operation at moderate electric power consumption is ensured without the need for a separate blocking mechanism. According to this embodiment of the invention, the reduction gear comprises a fist reduction train and a second reduction train, the first reduction train including a toothed belt connecting an output gear of the drive motor with an intermediate gear and the second reduction train including a threaded spindle and a screw nut engaged with the spindle, the second reduction train being functionally arranged between the intermediate gear and the output member. By selecting an appropriate geometry for the screw thread of the spindle, a self-locking feature is achieved, i.e. transmission is possible in only one direction (from input to output).

Another advantageous embodiment of the invention provides an haptic feedback to the driver of a manual park brake actuation process. According to this embodiment, the command unit comprises a manual actuating member movable within a predefined actuating range extending between a home position and an end position, any actuating stroke of the manual actuating member within this range being converted by the transducer into brake control commands adapted to move the output member across a corresponding stroke within a predefined range of brake strokes. Preferably, the command unit has a ratchet mechanism with a predetermined number of latching positions along the actuating range for selectively latching the actuating member in one of the latching positions, and further has a spring biasing the actuation member to the home position. The ratchet mechanism would typically provide a clicking sound in operation, similar to the sound generated by a conventional park brake lever.

SHORT DESCRIPTION OF DRAWINGS

Further advantages and features of the invention will become apparent from the following description of a preferred embodiment with reference to the drawings. In the drawings.

DETAILED DESCRIPTION OF PREFERRED EMBODIMENT

Figure 1:
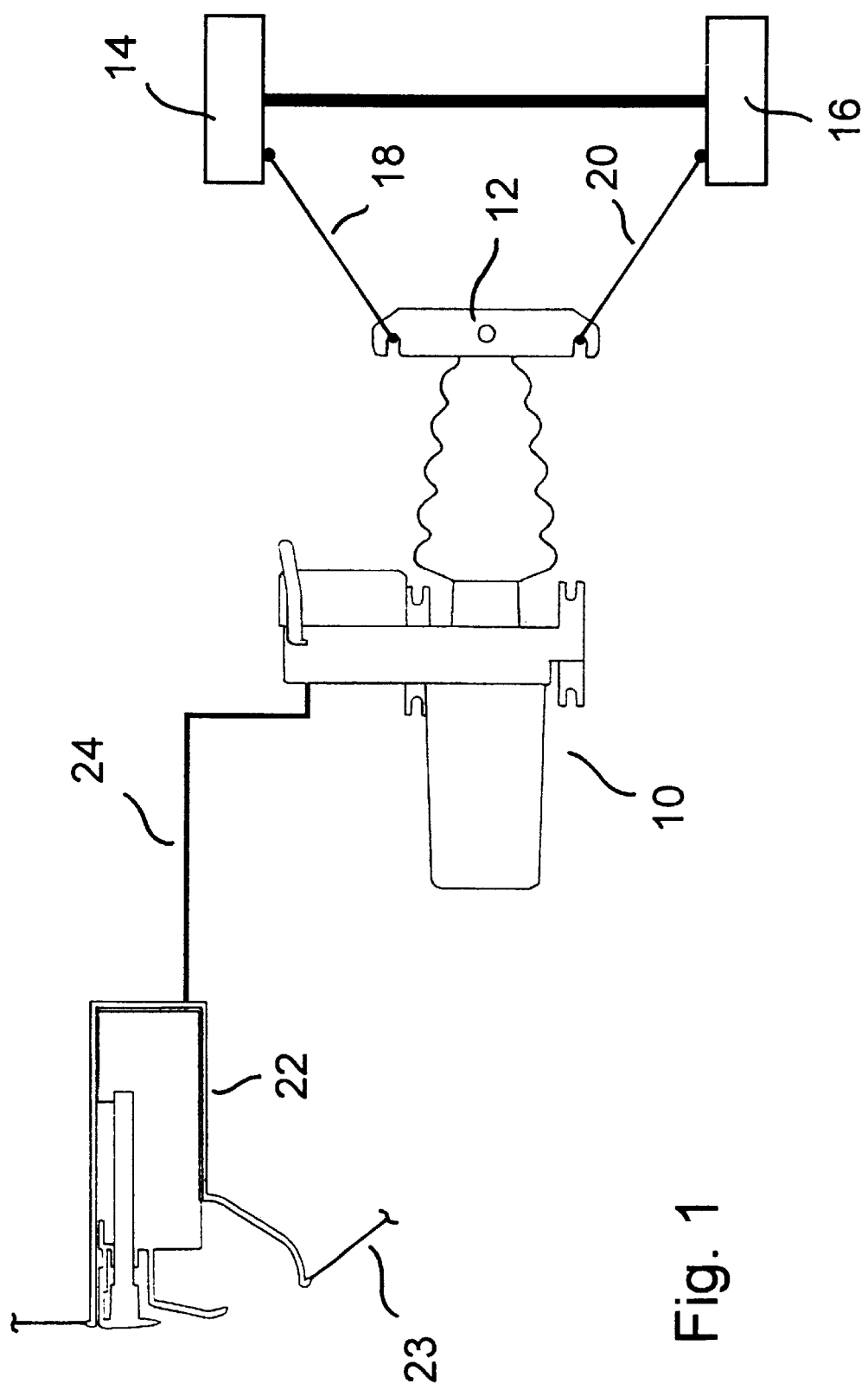
FIG. 1 is a diagrammatic view of the inventive park brake system.

With reference to FIG. 1, a park brake system is shown that generally includes an actuator 10 with an electric drive motor, a reduction gear and an output member 12, mechanical brakes on wheels 14, 16 of a vehicle, a pair of brake cables 18, 20 for connection of output member 12 to the brakes on wheels 14, 16, and a command unit 22 that is connected to the actuator 10 via line 24. The actuator 10 incorporates an electronic control unit, to be disclosed in farther detail below. Also to be disclosed below is a transducer incorporated in the command unit 22 for converting brake control commands into corresponding control signals for the electronic control unit. The command unit 22 can be incorporated in a vehicle dashboard 23, for example.

The Actuator

The actuator 10 (FIG. 2) has a generally parallelepipedal housing structure 30 molded of plastics with an integrally molded bearing sleeve 32. The housing structure 30 has a base wall 34 extending perpendicularly to the axis of bearing sleeve 32. Base wall 34 has an integrally molded tubular mounting structure 36 for a rotor shaft 38. Rotor shaft 38 belongs to a rotor 40 of an electric motor, the stator 42 of which is mounted on a printed circuit board 44 in turn mounded on and rigidly connected to base wall 34 in a parallel relationship. The electric motor is of an external rotor, brushless DC type, e.g. a 4-phase DC motor.

Besides a number of power semiconductor elements connected to the windings of stator 42 and an exemplary bulk capacitor 50, the printed circuit board 44 accommodates components of an electronic control unit to be described below with reference to FIG. 4.

A gear wheel 52 to is attached to rotor shaft 38. An externally threaded spindle 54 is rotatably and axially slidably mounted within bearing sleeve 32. On the outer periphery of bearing sleeve 32, a gear wheel 56 of larger diameter than gear wheel 52 is mounted rotatably, but axially fixed. Gear wheel 56 is attached to a lead screw nut 58 by screws 60. Lead screw nut 58 is engaged with an external thread 62 of spindle 54. A toothed belt 64 connects gear wheel 52 with gear wheel 56. Integrally connected with spindle 54 is an actuating shaft 66 having a free end to which a balanced cable bracket 68 is pivotally connected.

The cable bracket 68 is an output member of the actuator 10. The actuator, in fact, incorporates a two-step reduction gear train between the electric motor and the output member: a first step is a belt drive including gear wheels 52 and 56, and toothed belt 64; a second step is a screw-nut drive and includes threaded spindle 54 and lead screw nut 58. The first step has a high efficiency above 95%; the second step has a moderate efficiency of about 40%, but it is designed to be self-locking under all circumstances. High performance plastics are preferably used for all spindle gear components.

A bellows 70 is engaged about actuating shaft 66 between cable bracket 68 and bearing sleeve 32. A hood 72 is fitted onto base wall 34 with a space 74 adapted to accommodate an axial length of spindle 54. It is noted in FIG. 2 that rotor 40 and stator 42 of the electric motor, and the two-step gear train are arranged on opposite sides of base wall 34.

Manual Command Unit

Figure 3:
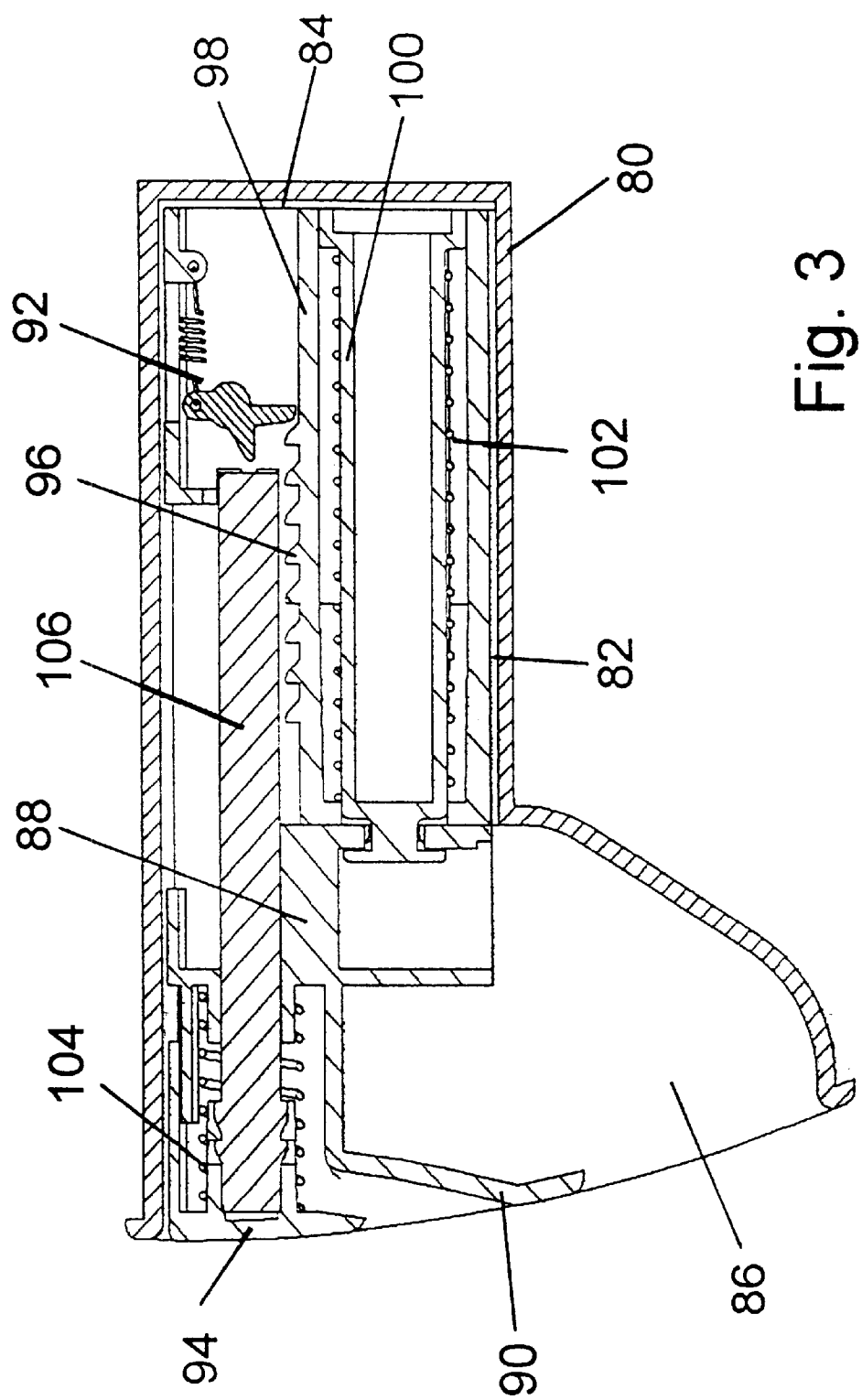
FIG. 3 is a sectional view of a manual command unit of the park brake system.

With reference to FIG. 3, the manual command unit (22 in FIG. 1), also referred to as a palette unit, has a housing 80 for attachment in the vehicle dashboard, for example. Housing 80 defines a generally cylindrical guide cavity 82 with a closed bottom 84 and an outwardly widening handle cavity 86 connected to the end of guide cavity opposite bottom 84. A handle assembly 88 with a handle 90, a spring-loaded ratchet 92 and a release button 94 is mounted within guide cavity 82 for axial movement therein. A rack structure 96 is fixedly mounted within guide cavity 82 to be coextensive with an axial stroke of ratchet 92. Rack structure 96 co-operates with ratchet 92. Rack structure 96 is carried by a hollow cylindrical guide member 98 accommodating a piston 100 and a helical pressure spring 102. Piston 100 is connected to handle assembly 88 for joint axial movement against the action of pressure spring 102.

Release button 94 is axially movably mounted in handle assembly 88 and biased to a normal non-actuated position by a pressure spring 104. An actuating rod 106 is connected to release button and has a free end opposite ratchet 92. By depressing release button 94, ratchet 92 is disengaged from rack structure 96.

Electronic Control Unit

Figure 2:
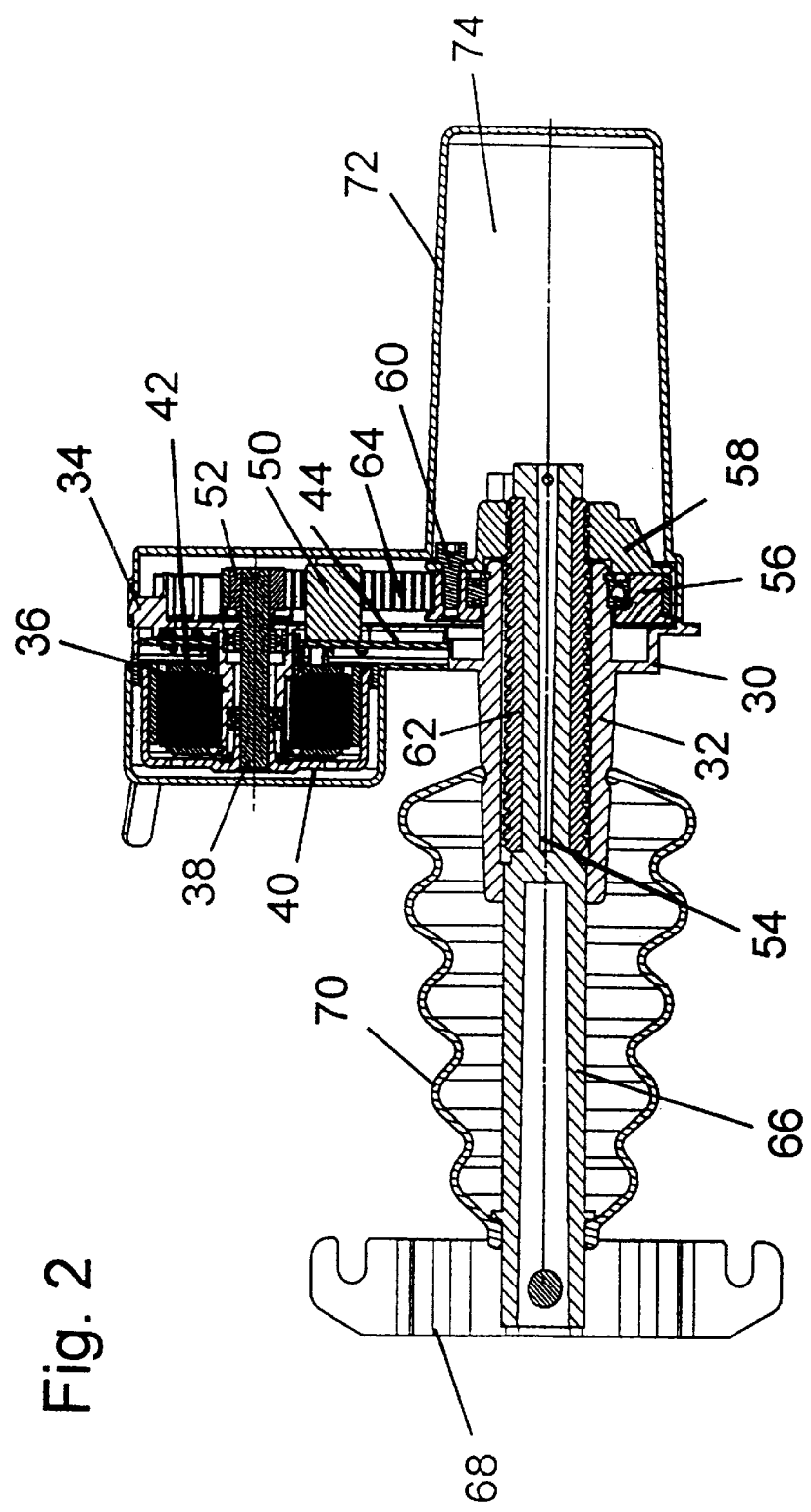
FIG. 2 is a sectional view of an actuator for the park brake system.
Figure 4:
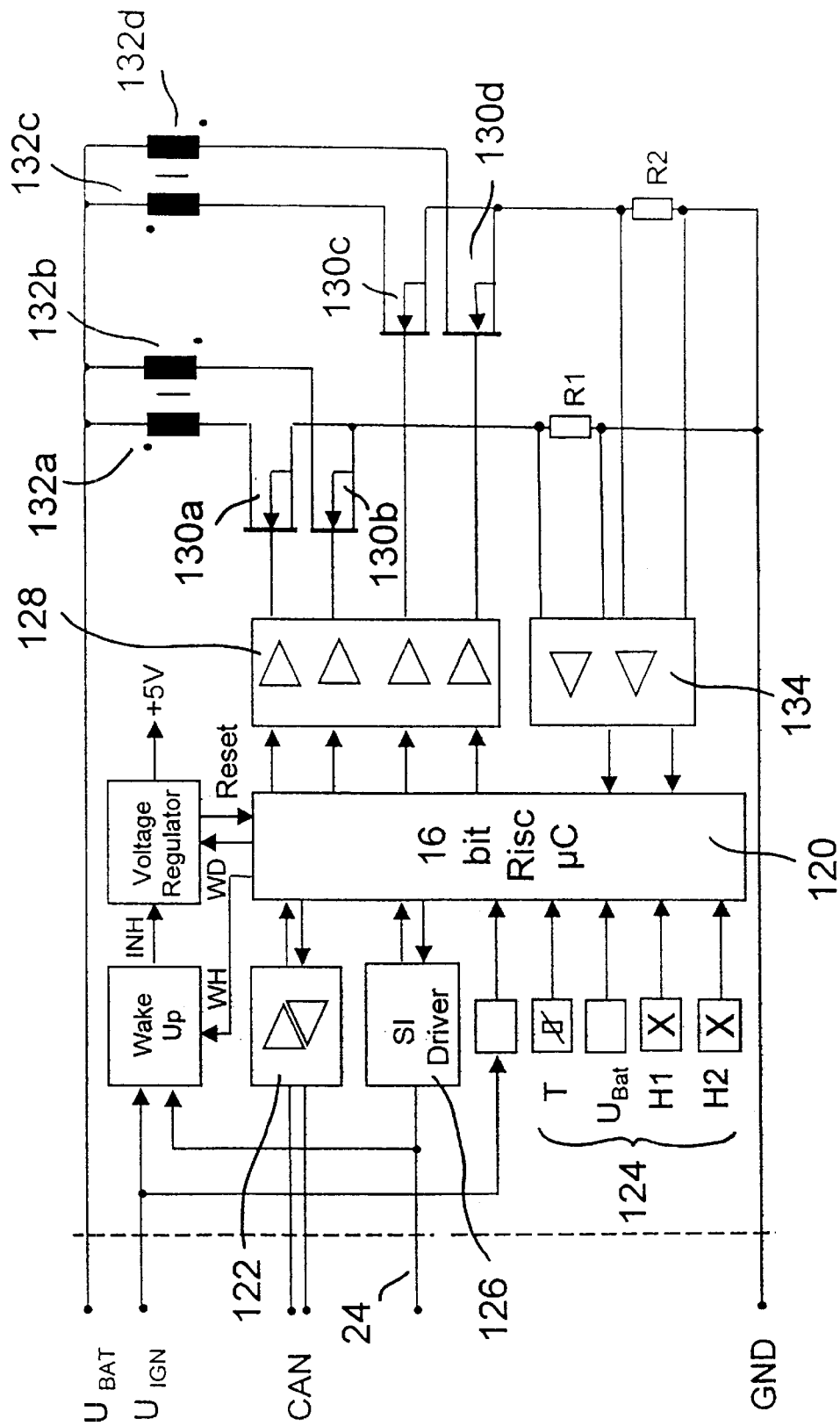
FIG. 4 is a block diagram of an electronic control unit.

With reference to FIG. 4, the electronic control unit within actuator 10 includes a microprocessor 120 with conventional supply and input terminals, a CAN bus interface 122 for connection to a CAN bus installed in the vehicle, an interface 124 for a number of analog inputs and an interface 126 for connection to the 24, i.e. to manual command unit 22. Outputs of microprocessor 120 are connected to inputs of a driver circuit 128 the outputs of which, in turn, are connected to the control gates of power semiconductors 130a to 130d each of which is associated with one of the four windings 132a to 132d of stator 42 (FIG. 2). Semiconductors 130a and 130b have their drains interconnected, and a current measurement resistor R1 is connected between both drains and ground. Similarly, semiconductors 130c and 130d have their drains interconnected, and a current measurement resistor R2 is connected between both drains and ground. Current measurement inputs are detected across resistors R1 and R2 and fed to microprocessor 120 through an A/D interface 134.

Transducer

Figure 5:
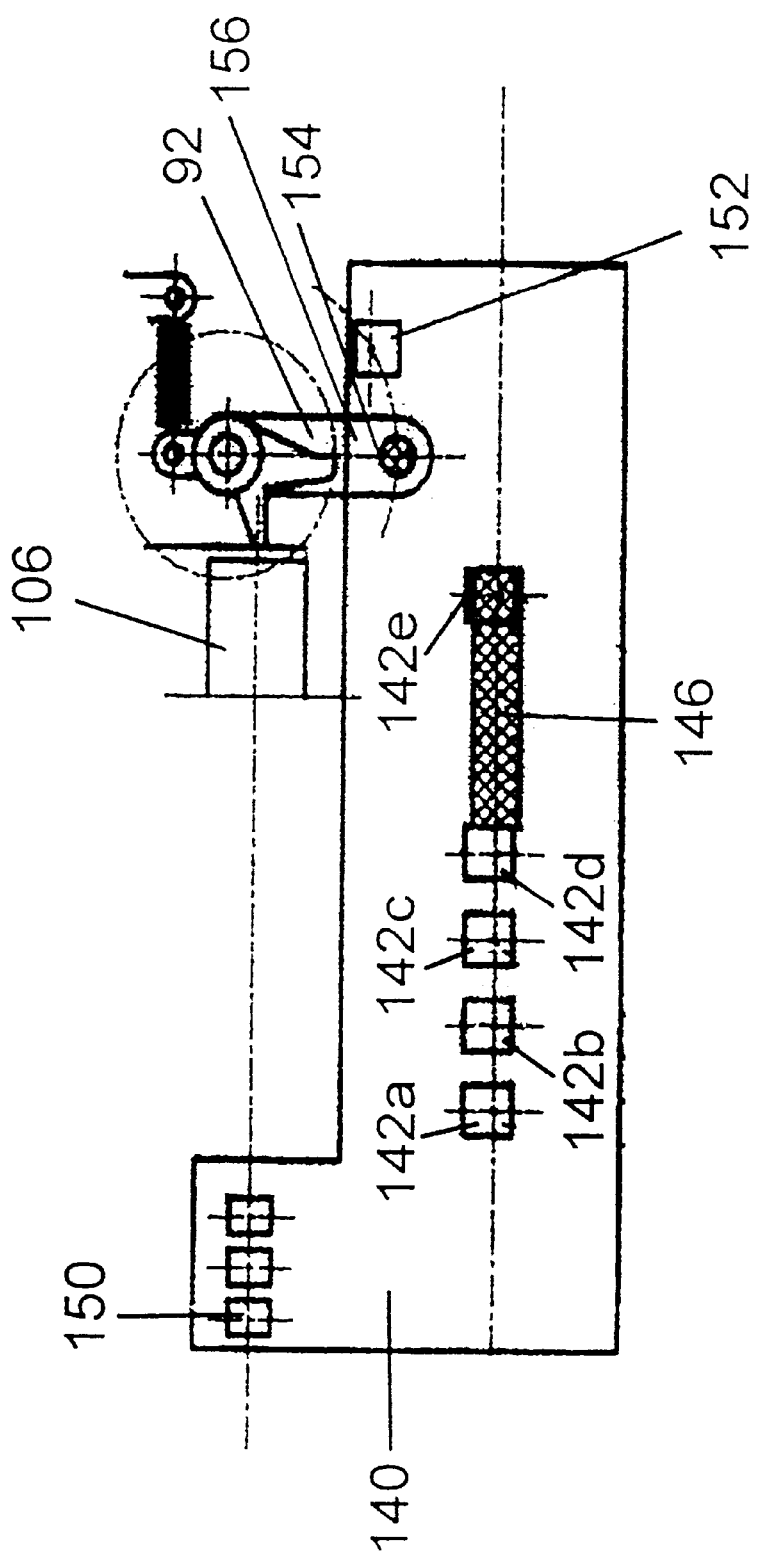
FIG. 5 is a schematic view of a transducer in the manual command unit.

With reference to FIG. 5, the transducer associated with the manual command unit shown in FIG. 3 includes a printed circuit board 140 attached to handle assembly 88 for joint axial movement. A plurality of Hall detectors 142a to 142e, five in the embodiment shown, are mounted on printed circuit board 140 in an axially extending row and spaced from each other. A magnetic strip 146 is attached to housing 80 of the manual command unit in a position aligned with the row of Hall detectors 142a to 142e. These Hall detectors with magnetic strip 146 form a position encoder for detecting the position of handle assembly 88 relative to housing 80.

A row of LEDs 150 is also mounted on printed circuit board 140. The actuating rod 106 is made of transparent plastics and constitutes a light guide. When the LEDs 150 are activated, light is coupled into actuating rod 106 for illumination of release button 94.

A further Hall detector 152 mounted on printed circuit board 140 co-operates with a magnet 154 carried by a pivotal lever 156 coupled with ratchet 92. The Hall detector 152 and magnet 154 function as a switch, an "auto-brake" switch, as will be explained below.

Operation—Manual Mode

In FIGS. 1 to 5 of the drawings, the park brake system is shown in an non-activated condition. With reference to FIGS. 1 and 2, spindle 54 with actuating shaft 66 and cable bracket 68 are extended to a first end position so that brake cables 18 20 are not tensioned. No electric current is fed to the windings 132a to 132d of the electric motor. Spindle 54 is blocked in the fully extended position due to the self-locking feature of the particular thread design of thread 62.

As seen in FIG. 3, the handle assembly 88 is in a home position and magnetic strip 146 (FIG. 5) covers only one of the Hall detectors, i.e. Hall detector 142e. To operate the park brake, handle 90 is pulled against the action of spring 102, and handle assembly 88 is moved partially out of housing 80. Ratchet 92 engages behind one of the teeth of rack 96, making a clicking noise. Magnetic strip 146 now covers Hall detector 142d and uncovers Hall detector 142e, and a corresponding position detection signal is sent on line 24 to the electronic control unit shown in FIG. 4. Interface 126 converts these position signals into brake control commands supplied to an input of microprocessor 120. In response, microprocessor 120 generates appropriate control signals for driver circuit 128, which then drives power semiconductors 130a to 130d to feed electric current to stator windings 132a to 132d of the electric motor. The amount of electric current is sensed by resistors R1 and R2, reflecting the torque developed by the electric motor. Rotation of gear wheel 52 is converted by the two-step reduction gear into axial movement of spindle 54, thereby moving cable bracket 68 and causing brake cables 18, 20 to be tensioned.

The degree of park brake actuation will depend on the position of handle assembly 88 relative to housing 80 of the manual command unit 22 within a predetermined range between the home position shown in FIG. 3 and an end position where the handle 90 and release button 94 will project some 20 or 30 mm from the dashboard. In the end position corresponding to a maximum brake stroke, magnetic strip 146 covers all of the Hall detectors 142a to 142d, only Hall detector 142e remaining uncovered.

To release the park brake, release button 94 is pushed and the free end of actuating rod 106 urges ratchet 92 to disengage from the teeth of rack 92, thereby permitting the handle assembly 88 to return to its home position under the action of spring 102. This will cause Hall detector 142e to be covered by magnetic strip 146, and all other Hall detectors will be uncovered. A corresponding position signal will be generated and sent to interface 122, thereby causing the microprocessor 120 to generate appropriate brake control signals to move cable bracket 68 to the initial position.

Operation—Automatic Mode

When the release button 94 is depressed and the handle assembly is in the home position, actuation rod 106 causes lever 156 to pivot and magnet 154 to cover Hall detector 152, thereby generating an "auto-brake" signal supplied to the electronic control unit. Simultaneously, the LEDs 150 are activated to signal the auto-brake mode by illumination of release button 94. The electronic control unit will now automatically activate the park brake whenever a complete stop of the vehicle is detected, and deactivate the park brake as required, e.g. when the accelerator pedal is depressed.

To disable the auto-brake mode, the release button 94 is depressed again. Alternatively, handle 9 is pulled. The auto-brake function may also be disabled whenever the reverse gear is used or when ignition is switched off.

I claim:

1. A park brake system for vehicles comprising:
   an actuator with an electric drive motor and an electronic control unit having an interface,
   a reduction gear having an input connected to the output of the electric motor and an output member for connection to mechanical brakes of the vehicle, and
   a manual command unit operated by the driver with a transducer connected to the interface of said electronic control unit;
   said transducer providing signals indicating a position of a member of said manual command unit within a predefined range, said signals being converted by said interface into digital control signals enabling the electronic control unit to generate corresponding brake control commands.

2. The park brake system of claim 1, wherein said reduction gear comprises a fist reduction train and a second reduction train, the first reduction train including a toothed belt connecting an output gear of said drive motor with an intermediate gear and the second reduction train including a threaded spindle and a screw nut engaged with said spindle, said second reduction train being functionally arranged between said intermediate gear and said output member.

3. The park brake system of claim 2, comprising a common carrier with a base wall mounting said drive motor and said spindle.

4. The park brake system of claim 3, wherein said base wall is integrally molded with a tubular mounting structure for said spindle and for said screw nut.

5. The park brake system of claim 3, wherein said base wall is integrally molded with a tubular mounting structure for the rotor of said electric drive motor.

6. The park brake system of claim 2, wherein said screw nut forms a hub portion of said intermediate gear and said spindle is axially movably mounted and has a free end provided with said output member.

7. The park brake system of claim 6, wherein said output member is adapted for connection to a brake cable.

8. The park brake system of claim 2, wherein said second reduction train is self-locking.

9. The park brake system of claim 2, wherein said drive motor and reduction gear are mounted on opposite sides of said base wall.

10. The park brake system of claim 1, wherein said command unit has an auto-brake control switch which, on actuation, provides a brake activation command whenever the vehicle comes to a complete stop.

11. The park brake system of claim 10, wherein said release button functions to actuate said auto-brake control switch if said actuating member is in the home position.

12. The park brake system of claim 11, wherein said release button is equipped with visual indication means signalling activation of the auto-brake switch.

13. The park brake system of claim 1, wherein said electric drive motor is a high torque brushless DC motor.

14. The park brake system of claim 1, wherein the transducer comprises a plurality of Hall detectors spaced from each other in a direction corresponding to said actuating range and a magnetic strip, said plurality of Hall detectors and said magnetic strip being movable relative to each other on movement of said manual actuating member to incrementally expose said Hall detectors to said magnetic strip.

15. A park brake system for vehicles comprising:
   an actuator with an electric drive motor and an electronic control unit having an interface,
   a reduction gear having an input connected to the output of the electric motor and an output member for connection to mechanical brakes of the vehicle, and
   a command unit with a transducer connected to the interface of said electronic control unit;
   said transducer providing position indicating signals that are converted by said interface into digital control signals enabling the electronic control unit to generate corresponding brake control commands,
   said reduction gear comprising a first reduction train and a second reduction train, the first reduction train including a toothed belt connecting an output gear of said drive motor with an intermediate gear and the second reduction train including a threaded spindle and a screw nut engaged with said spindle, said second reduction train being functionally arranged between said intermediate gear and said output member.

16. The park brake system of claim 15, comprising a common carrier with a base wall mounting said drive motor and said spindle.

17. The park brake system of claim 16, wherein said base wall is integrally molded with a tubular mounting structure for said spindle and for said screw nut.

18. The park brake system of claim 16, wherein said base wall is integrally molded with a tubular mounting structure for the rotor of said electric drive motor.

19. The park brake system of claim 15, wherein said screw nut forms a hub portion of said intermediate gear and said spindle is axially movably mounted and has a free end provided with said output member.

20. The park brake system of claim 19, wherein said output member is adapted for connection to a brake cable.

21. The park brake system of claim 15, wherein said second reduction train is self-locking.

22. The park brake system of claim 15, wherein said drive motor and reduction gear are mounted on opposite sides of said base wall.

23. A park brake system for vehicles comprising:
- an actuator with an electric drive motor and an electronic control unit having an interface,
- a reduction gear having an input connected to the output of the electric motor and an output member for connection to mechanical brakes of the vehicle, and
- a command unit with a transducer connected to the interface of said electronic control unit;
- said transducer providing position indicating signals that are converted by said interface into digital control signals enabling the electronic control unit to generate corresponding brake control commands,
- said command unit comprising a manual actuating member movable within a predefined actuating range extending between a home position and an end position, any actuating stroke of said manual actuating member within said range being converted by said transducer into control signals adapted to move said output member across a corresponding stroke within a predefined range of brake strokes,
- the transducer comprising a plurality of Hall detectors spaced from each other in a direction corresponding to said actuating range and a magnetic strip, said plurality of Hall detectors and said magnetic strip being movable relative to each other on movement of said manual actuating member to incrementally expose said Hall detectors to said magnetic strip.

* * * * *